US008095731B2

(12) United States Patent
White

(10) Patent No.: US 8,095,731 B2
(45) Date of Patent: Jan. 10, 2012

(54) MUTABLE OBJECT CACHING

(75) Inventor: Abe White, Houston, TX (US)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 12/266,403

(22) Filed: Nov. 6, 2008

(65) Prior Publication Data

US 2010/0115203 A1 May 6, 2010

(51) Int. Cl.
*G06F 12/00* (2006.01)
(52) U.S. Cl. .................................. 711/118; 711/128
(58) Field of Classification Search .................. 711/118, 711/128
See application file for complete search history.

(56) References Cited

U.S. PATENT DOCUMENTS

| 6,772,255 | B2 * | 8/2004 | Daynes | 710/200 |
| 7,805,710 | B2 * | 9/2010 | North | 717/136 |
| 2003/0208500 | A1 * | 11/2003 | Daynes et al. | 707/100 |

* cited by examiner

*Primary Examiner* — Hashem Farrokh
(74) *Attorney, Agent, or Firm* — Fliesler Meyer LLP

(57) ABSTRACT

In one embodiment, a method for caching mutable objects comprises adding to a cache a first cache entry that includes a first object and a first key. Assigning a unique identification to the first object. Adding an entry to an instance map for the first object. The entry includes the unique identification and the first object. Creating a data structure that represents the first object. The data structure includes information relevant to the current state of the first object. A second cache entry is then added to the cache. The second cache entry includes the data structure and the unique identification. Updating the first cache entry to replace the first object with the unique identification.

20 Claims, 10 Drawing Sheets

MUTABLE OBJECT CACHING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to Java-based computing environments, and in particular to a system and method for mutable object handling.

BACKGROUND

Caching refers to the temporary storage of data to achieve higher performance in software systems. This performance gain can be achieved by reducing the number of accesses to the original record of data which may require intensive computing operations to create, or be otherwise expensive (in terms of resources) to access. Performance gains can also be achieved by sharing the cached data across threads in a process, processes, and potentially across processes spread over multiple machines.

A cached object is an object that is placed in the cache. Each cached object is referenced by a key, selected by the user when the user adds the object to the cache. Objects in the cache are generally either serializable or mutable. A mutable object is an object whose internal state can be mutated, or changed, by the user. This includes instances of user-defined classes that have been identified as mutable via configuration, as well as instances of standard mutable types such as collections, maps, and dates.

SUMMARY

In one embodiment, a method for caching mutable objects comprises adding to a cache a first cache entry that includes a first object and a first key. Assigning an unique identification to the first object. Adding an entry to an instance map for the first object. The entry includes the unique identification and the first object. Creating a data structure that represents the first object. The data structure includes information relevant to the current state of the first object. A second cache entry is then added to the cache. The second cache entry includes the data structure and the unique identification. Updating the first cache entry to replace the first object with the unique identification.

DETAILED DESCRIPTION

Storing data in a cache enables multiple users to share the same data, without keeping multiple copies of the data at various locations. Additionally, popular or often used data can be quickly retrieved from a cache without requiring the original data to be repeatedly accessed, which may consume a large amount of system resources.

Figure 1:
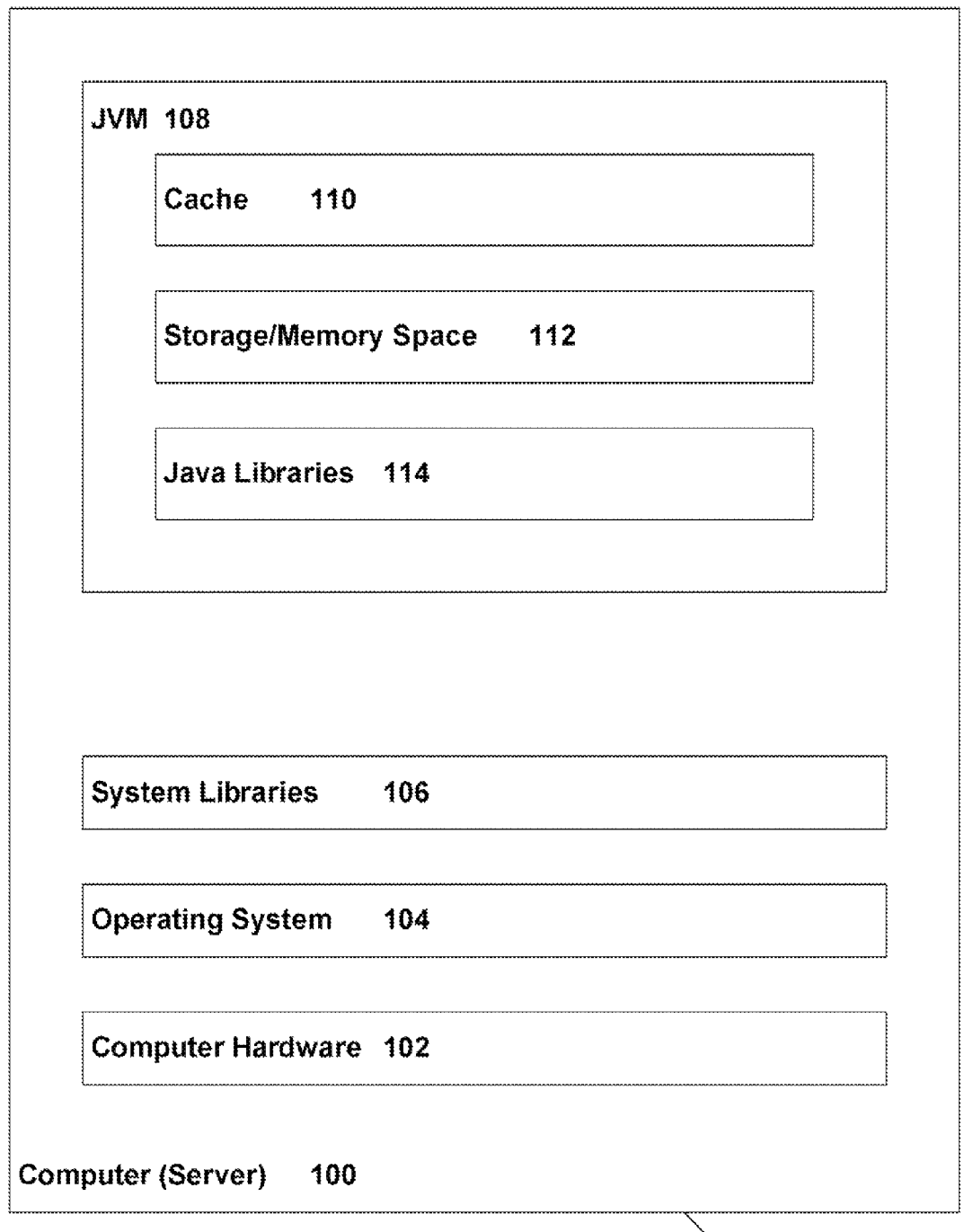
FIG. 1 shows an example of a cache system.

FIG. 1 shows an example of a cache system. In one embodiment, the system 101 may include a computer 100, that includes hardware 102, operating system 104, and system libraries 106. The system may also include a virtual machine 108. The virtual machine may be a Java Virtual Machine (JVM), examples of which include the Sun Microsystems Inc. Java Virtual Machine and JRockit from BEA Systems, Inc. The JVM includes a cache 110. The JVM may also include or have access to a storage area or memory space 112 and Java libraries 114. In one embodiment, the cache can be a highly available distributed cache in which the computer 100 may be one of a number of separate physical machines on which the distributed cache operates.

In a traditional cache, changes made to a cached object are generally not detected. This can present problems for a user who wishes to cache mutable objects including identity, isolation, and management problems. One problem mutable objects pose to traditional caches is a loss of identity. After changes have been made to a cached object, future attempts to access that cached object may not always return the same instance. This results in inconsistencies and can present problems for the user.

A decorator can be used to address this problem. A decorator, also called a wrapper, is a function that enables a user to transparently add functionality to an otherwise static object at runtime without requiring any changes to the object's code. A mutable object decorator can be used to implement improved mutable object handling in a cache. The mutable object decorator maintains an instance map, which it uses to keep track of mutable object instances that are currently in use. Using the instance map, whenever a user attempts to retrieve an object from the cache, the decorator ensures that the user retrieves the same instance of that object. This preserves the identity of mutable objects, even as they are later changed or updated.

Another problem mutable objects pose to traditional caches relates to isolation. In a shared cache, multiple users have access to the same data stored in the cache. Transactional isolation prevents other users who have access to the cache from seeing changes made to a cached object, before those changes are complete.

In one embodiment, improved transactional isolation is implemented through a transactional decorator. In one embodiment, the transactional decorator can detect an operation on a cache. The decorator can then create a workspace. Any changes that are made to a cached object during the transaction are not made directly to the cached object. Instead the changes are stored in the workspace. Other users attempting to access the cached object will not see any of the changes stored in the workspace and will instead be locked out of the cached object or retrieve an earlier version of the cached object, depending on the implementation. Once the transaction has completed, the changes stored in the workspace are applied to the cache and can be viewed by other users.

In a traditional cache, mutable objects can also present management problems for the user. Generally, when a user makes a change to a cached object, the user must then update the cache. This forces the user to micromanage the cache. Additionally, depending on implementation, changes to one cache may require one or more other caches to update. This update is usually performed by serializing the updated objects and sending them to the other caches. However, one updated field of one object may trigger the serialization of the entire object or the entire object graph. This can consume substantial system resources. Also, serialization presents another identity problem since serialization does not preserve object identity. In one embodiment, the mutable object decorator automatically detects changes to cached objects and updates them accordingly, without additional user management. In another embodiment, mutable objects are not serialized.

Figure 2:
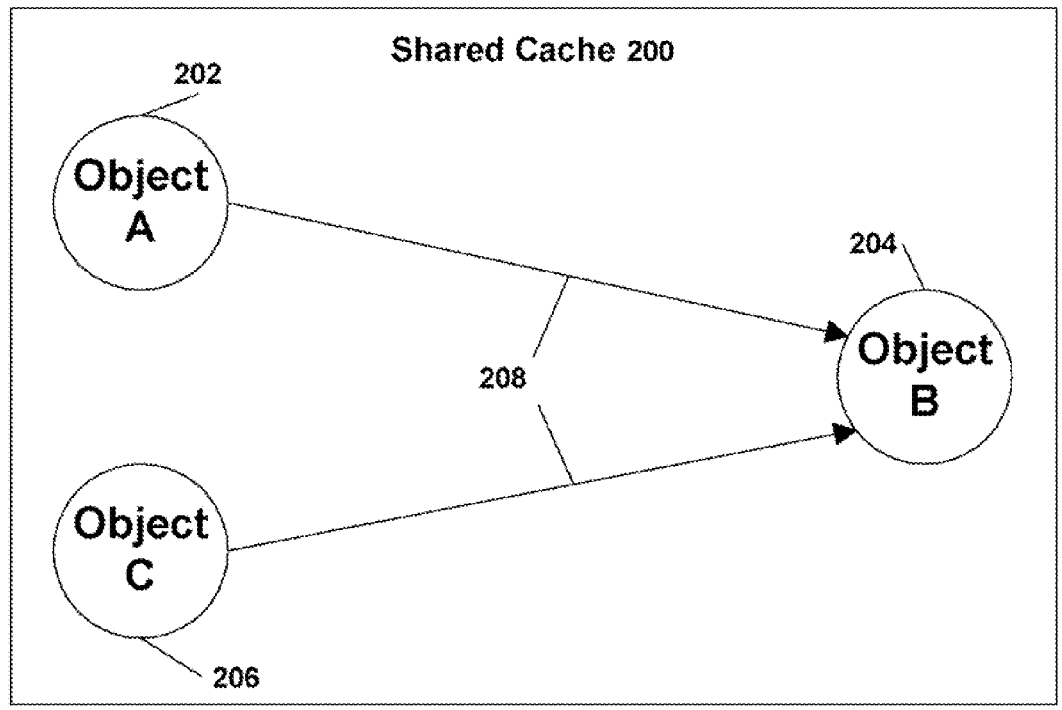
FIG. 2 shows an example of a shared cache.
Figure 2:
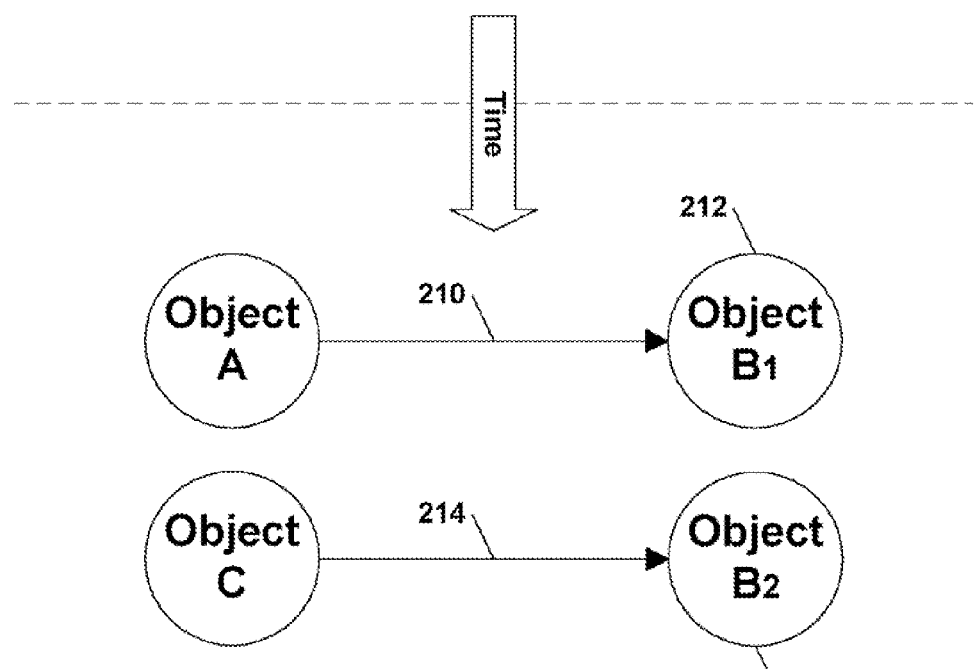

FIG. 2 shows an example of cached objects. In FIG. 2a, three objects are cached in the cache 200. Object A 202 and Object C 206 both reference 208 Object B 204. If a user later retrieves Object A and traverses 210 to Object B, the user may retrieve one instance of B, B1 212. But if the user, or another user, then retrieves Object C and traverses 214 to Object B, that user may retrieve a different instance of B, B2 216.

Figure 3:
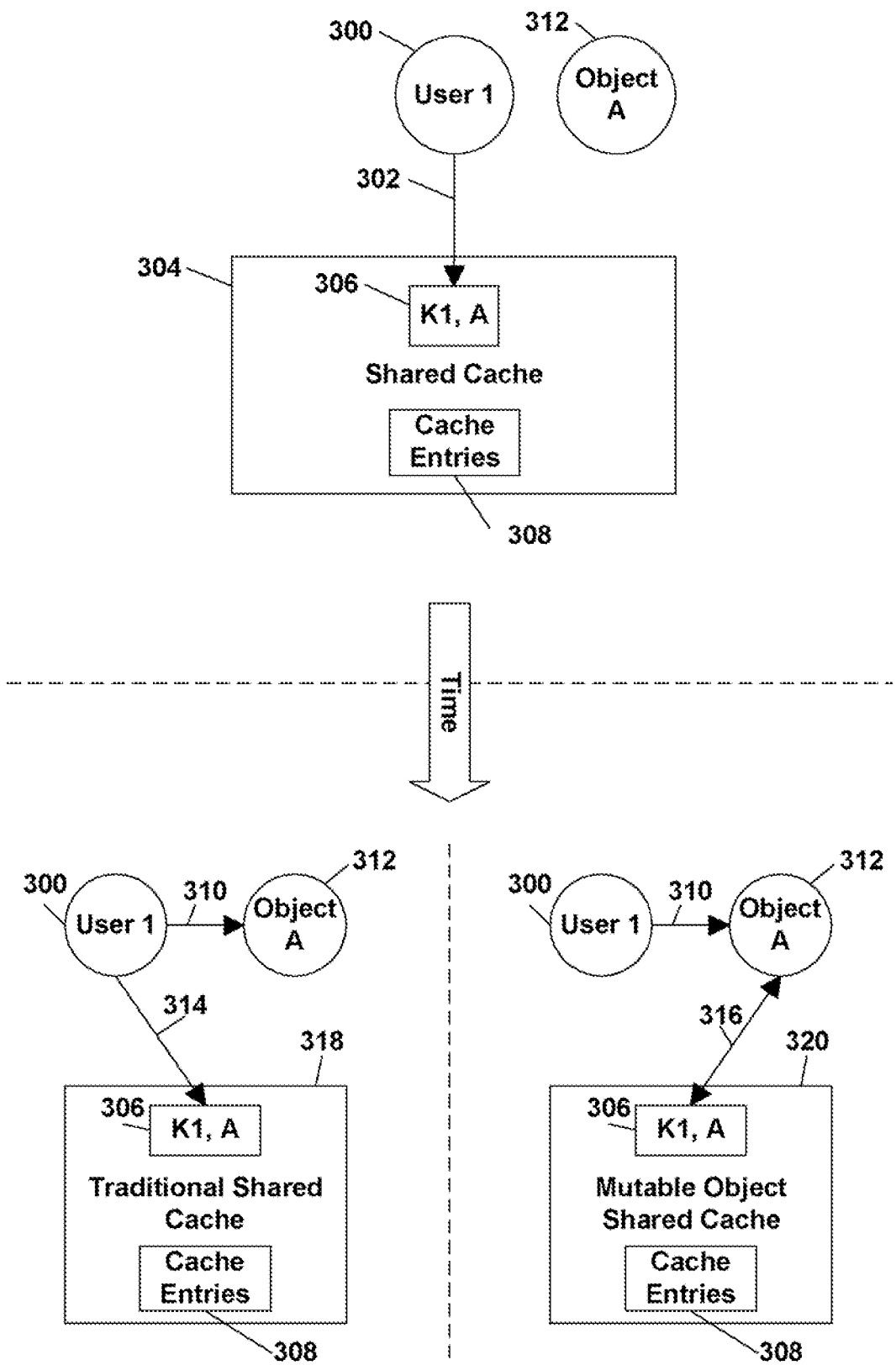
FIG. 3 shows an example of cached objects in both a mutable object cache and a traditional cache.

FIG. 3 shows an example of cached objects in both a mutable object cache and a traditional cache. User 1 300 creates 302 a cache entry 306 for Object A 312 in a shared cache 304. Object A is indexed by key K1, and joins a plurality of cache entries 308. Each cache entry includes an object indexed by a key. If User 1 then makes changes 310 to Object A, in a traditional shared cache 318 User 1 needs to notify 314 the cache of the change. This forces the user to micro-manage the cache. In a mutable object shared cache 320, however, if User 1 makes a change to Object A, the change is automatically detected 316 by the cache and the entry is updated without further user input.

Transactional Cache

Transaction Types

Generally, there are two major types of transactions, pessimistic and optimistic. Pessimistic transactions use locks to prevent concurrent processes from modifying the data that is being used in the transaction. The use of locks prevents conflicts between concurrent processes but it increases the required system resources and can cause a deadlock. In a deadlock, two processes are each waiting for the other process to release its locks before completing the transaction.

Optimistic transactions generally use versioning instead of locks. This uses fewer system resources but is less reliable than pessimistic transactions. Concurrent processes may modify the same data and the conflict will not be detected until the later process attempts to commit the transaction. At this point the later process will realize that the version information is incorrect causing the transaction to throw an exception or be rolledback.

The cache can be a transactional cache which supports local pessimistic transactions. Pessimistic transaction isolation levels are implemented using a combination of read and write locks to isolate changes. When there is heavy contention for cache data, however, it can be inefficient to lock portions of the cache for extended periods of time, as pessimistic transactions often do. Accordingly, in another embodiment, the cache supports optimistic transactions which allow for greater concurrency by using data versioning in place of locking.

Data versioning works by recording the version of each cache entry as it is accessed throughout the transaction. When the transaction commits, the recorded version for each entry is compared to the entry's current version in the cache. In the event of a version mismatch, the commit fails. This could happen if, for example, a concurrent transaction altered the entry—thereby incrementing its version—after the first transaction recorded the entry's version, but before the first transaction committed.

Optimistic transactions use the same read and write locks used in pessimistic transactions, but the locks are held for a shorter duration (e.g., when an entry is retrieved and when the transaction merges its isolated changes back into the main cache on commit). So while optimistic transactions may occasionally force a rollback if version validations fail or may run slightly slower than pessimistic locking due to the inevitable overhead of recording data versions and validating on commit, they allow for a high level of isolation while also maintaining a very high level of concurrency.

Transactional Cache Creation

In one embodiment, a cache can be made transactional when it is created. A cache manager provides methods to create caches based on a properties map. In one embodiment, the properties map may include the following transaction-related properties:

Transaction Type: None, Pessimistic, or Optimistic. Default is None.

Transaction Isolation: Read-Uncommitted, Read-Committed, or Repeatable-Read. Default is Repeatable-Read.

Transaction Manager: Local. Specify Local in an SE environment Transaction Manager. Default is Local.

Locking Enabled: Must be left unset or set to true if the Transaction Type is not None. Attempting to disable locking when transactions are enabled results in a configuration exception on cache creation.

If the Transaction Type is set to None, the cache is not transactional. Otherwise, the internal cache is wrapped in a transactional decorator. The transactional decorator provides handles the transactional behavior which allows the cache to remain focused on basic data storage and retrieval. The transactional decorator also keeps the implementation details of the transactional behavior invisible to outside code.

A transactional cache, like a non-transactional cache, appears as a single map. In one embodiment, the transactional cache maintains an internal mapping between each transaction and the data it has changed, i.e., its workspace. When the transaction successfully commits, the changes in the workspace are merged into the cache. In doing so, the transactional cache keeps each transaction isolated from other concurrent transactions, preventing changes made in one transaction from being seen by other transactions until the changes are complete.

This maximizes transparency to users and allows strict thread affinity to be naturally enforced for transactions. The locking necessary to implement transactional isolation often requires matching a client requesting a lock to any locks that client might already hold, and identifying clients by thread provides a simple way to do this. Thread affinity also helps prevent complicating the entire API stack by passing client identifiers or already-held locks in all map operations.

Exemplary Methods

Figure 4:
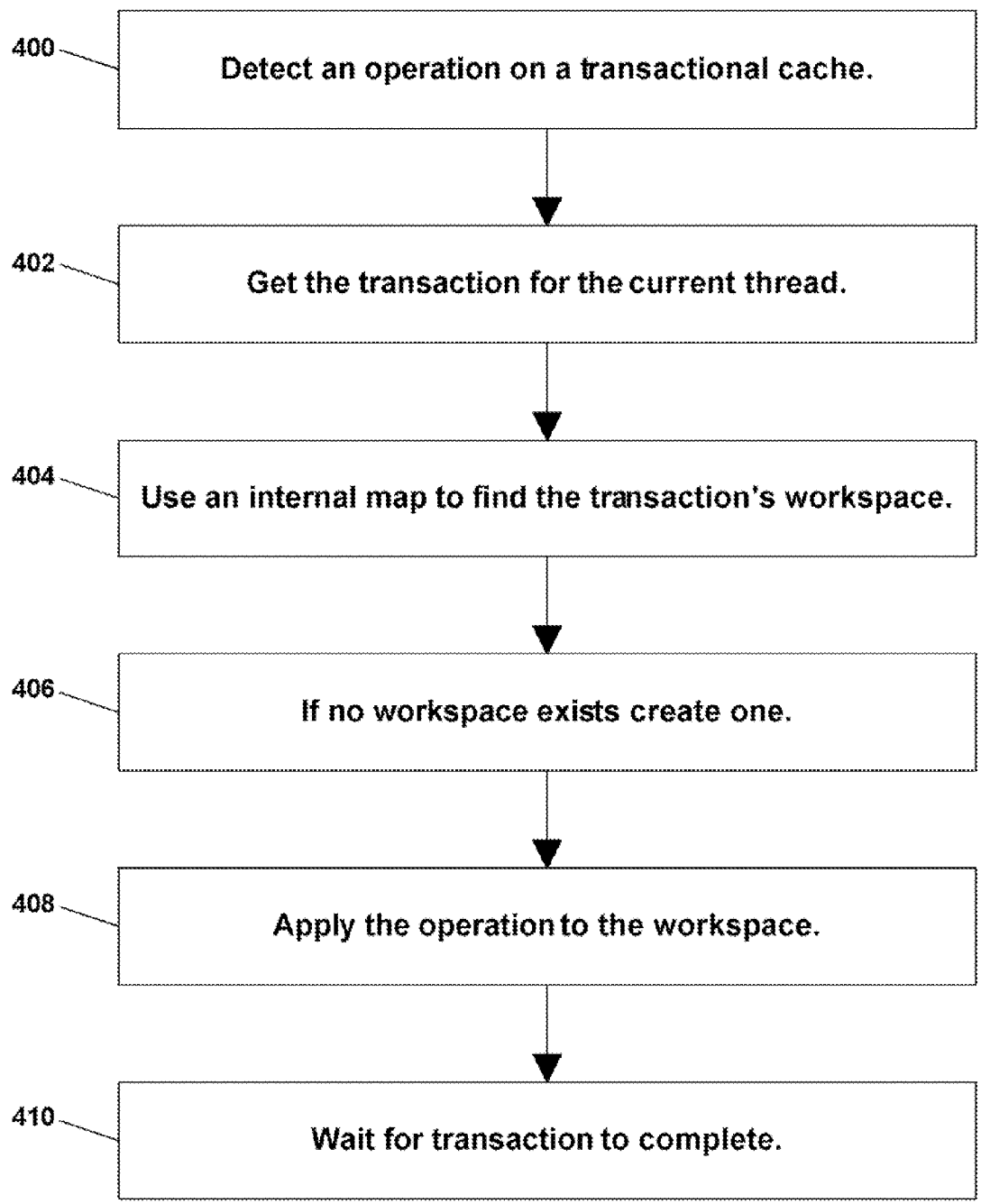
FIG. 4 shows a method for transactional isolation in a shared cache in accordance with an embodiment.

FIG. 4 shows a method for transactional isolation in a shared cache in accordance with an embodiment. At block 400, an operation on a transactional cache is detected. At block 402, the transaction for the current thread is retrieved. If no transaction is in progress, the operation is passed through to the underlying cache. Otherwise, at block 404, the transactional decorator's internal mapping between transactions and workspaces is used to find the transaction's workspace. At block 406, if no workspace exists, one is created. For pessimistic transactions, locks on the affected entries are obtained based on the configured isolation level. For optimistic transactions, the versions of the affected entries are recorded. At block 408, the operation is applied to the workspace. At block 410, the process waits for the transaction to complete.

When the user issues a commit or rollback the transaction completion process is initiated. In one embodiment, transaction completion first includes collecting the changes that were made during the transaction. As described above, these changes are stored in the transaction's workspace. The changes are then batched into an object that can be used to apply the changes to the cache. First, write locks on all modified entries are obtained. Then, if the transaction is optimistic, the versions of all entries are validated against the transaction's recorded versions. The transactional changes are then applied to the underlying cache, and the previous state is saved for rollback. If the validation fails then a rollback is called. If the validation is successful and the transaction committed, then the transaction has completed and the updates have been applied. Regardless of whether validation is successful, all locks are released and the transactional workspace is cleared.

In one embodiment, the JAVA Transaction API is used with the transactional cache. When the JTA transaction ends, the transaction completion process is initiated. In one embodiment, cache transaction completion uses the standard synchronization callbacks: beforeCompletion and afterCompletion. In beforeCompletion, workspace changes are batched into an action—an object that performs a series of operations on the cache. This action has two phases. The prepare phase obtains write locks on all modified entries, subject to the configured transaction isolation. If the transaction is optimistic, this phase also validates the versions of all entries against the transaction's recorded versions. The transactional changes are then applied to the underlying cache, and the previous state is saved for rollback. The run phase executes a rollback if necessary. The beforeCompletion callback only performs the prepare phase.

The steps taken in the afterCompletion callback depend on whether the transaction was rolled back or committed. If it was rolled back, afterCompletion performs the run phase of the action prepared in beforeCompletion to roll back cache changes. If the transaction committed, however, the action is simply closed. In both cases, all locks are released and the transactional workspace is cleared.

Figure 5:
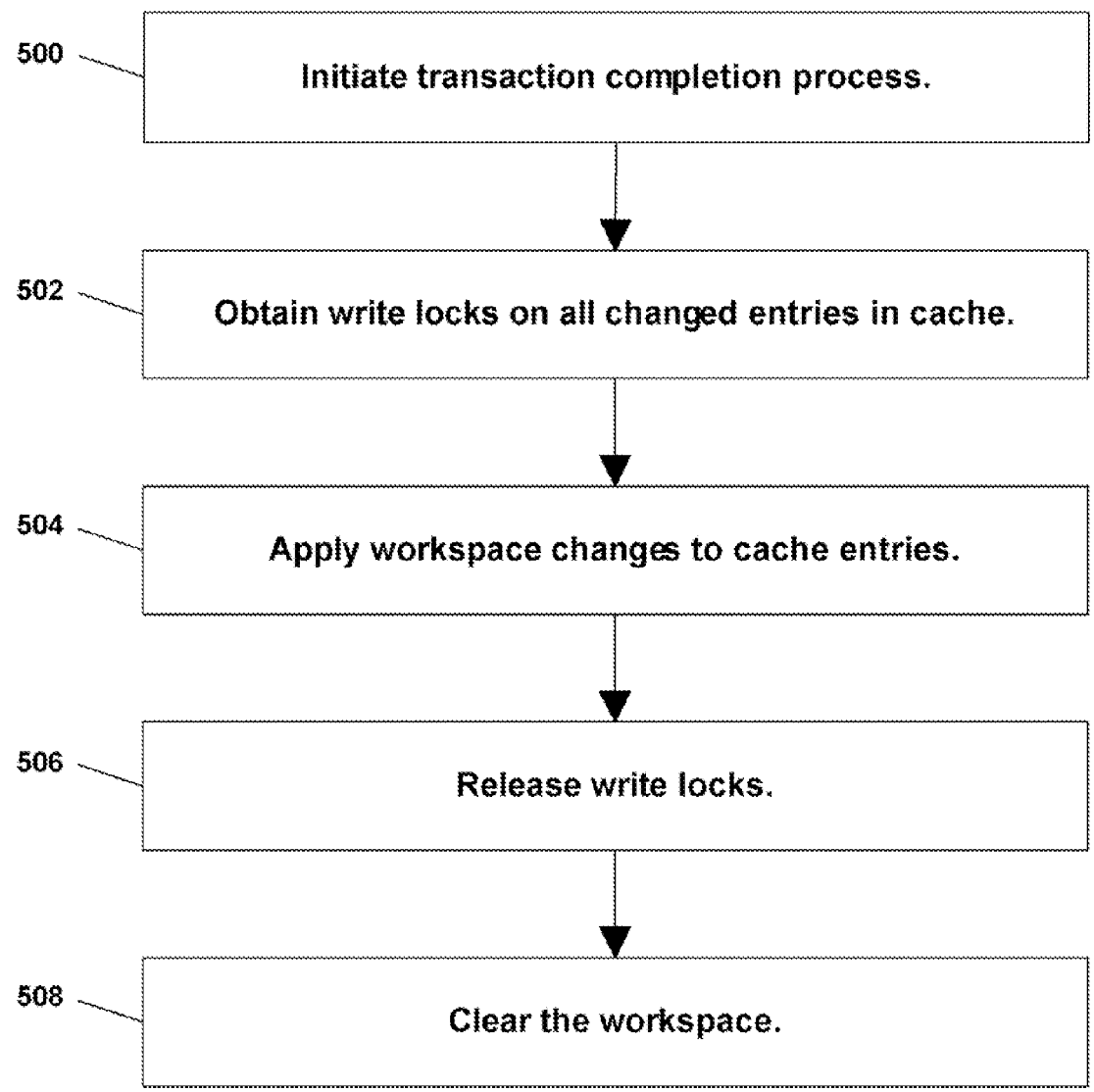
FIG. 5 shows a method for transactional isolation in a shared cache in accordance with an embodiment.

FIG. 5 shows a method for transactional isolation in a shared cache in accordance with an embodiment. At block 500, the transaction completion process is initiated. At block 502, write blocks are obtained on all changed entries in the cache. At block 504, the changes in the workspace are applied to the cache entries. At block 506 the write blocks are released. At block 508, the workspace is cleared.

Thus, implementing atomic, consistent, isolated, and durable (ACID) transactions can be achieved through a combination of workspaces, read-write locks, and action objects. The transactional decorator maintains the workspaces and defines the action objects. The underlying cache implements the read-write locks and runs the action objects.

In one embodiment, every cache entry has a read lock that supports multiple readers, and an exclusive write lock that prevents other readers and other writers from accessing the entry. In one embodiment, a cache may lock regions, including multiple entries, or other coarse-grained constructs in place of individual entries. Read locks can be upgraded to write locks. Lock ownership is thread-based, and requesting a lock that is already held by the current thread has no effect. Even in the absence of transactions, reading an entry implicitly acquires and immediately releases its read lock, and changing an entry acquires and immediately releases its write lock. For local transactions, only local locks are required. To additionally support full ACID transactions across a cluster, cluster-wide locks are required. Importantly, however, no changes to the transactional decorator are needed. The clustered cache need only implement its lock APIs to use cluster-wide locks instead of local ones.

In one embodiment, actions are used to batch operations. An action is given a reference to the cache and can perform any series of operations it likes. Actions are serializable, so they can be sent in a single trip to run on a cache in a separate JVM, rather than incurring the overhead of many individual remote calls.

The value of having a separate prepare phase is two-fold. First, it allows the encapsulation and easy cancellation of a multi-step process in which resources are held between steps, such as the commit process described above. More importantly, though, a properly implemented prepare phase increases the likelihood that an action will succeed completely or fail completely.

Mutable Object Cache

The cache system can include specialized mutable object handling. Instances of standard mutable types such as collections, maps, and dates are automatically handled as mutable objects. The user may also configure user-defined classes for mutable object handling. In one embodiment, under mutable object handling, changes to the internal state and relations of mutable objects are detected automatically. Also, object identity is preserved within the cache. In one embodiment, mutable objects are not serialized.

In one embodiment, in addition to configured user-defined classes, the cache system handles many standard types as mutable objects, including collections, maps, and dates. In another embodiment, a mutable object may be stored in multiple cached object graphs and may be reachable via multiple paths in the same object graph. Retrieval of the same mutable object always returns the same instance, regardless of the retrieval path—the cache key and relation traversal—used to navigate to the object.

Figure 6:
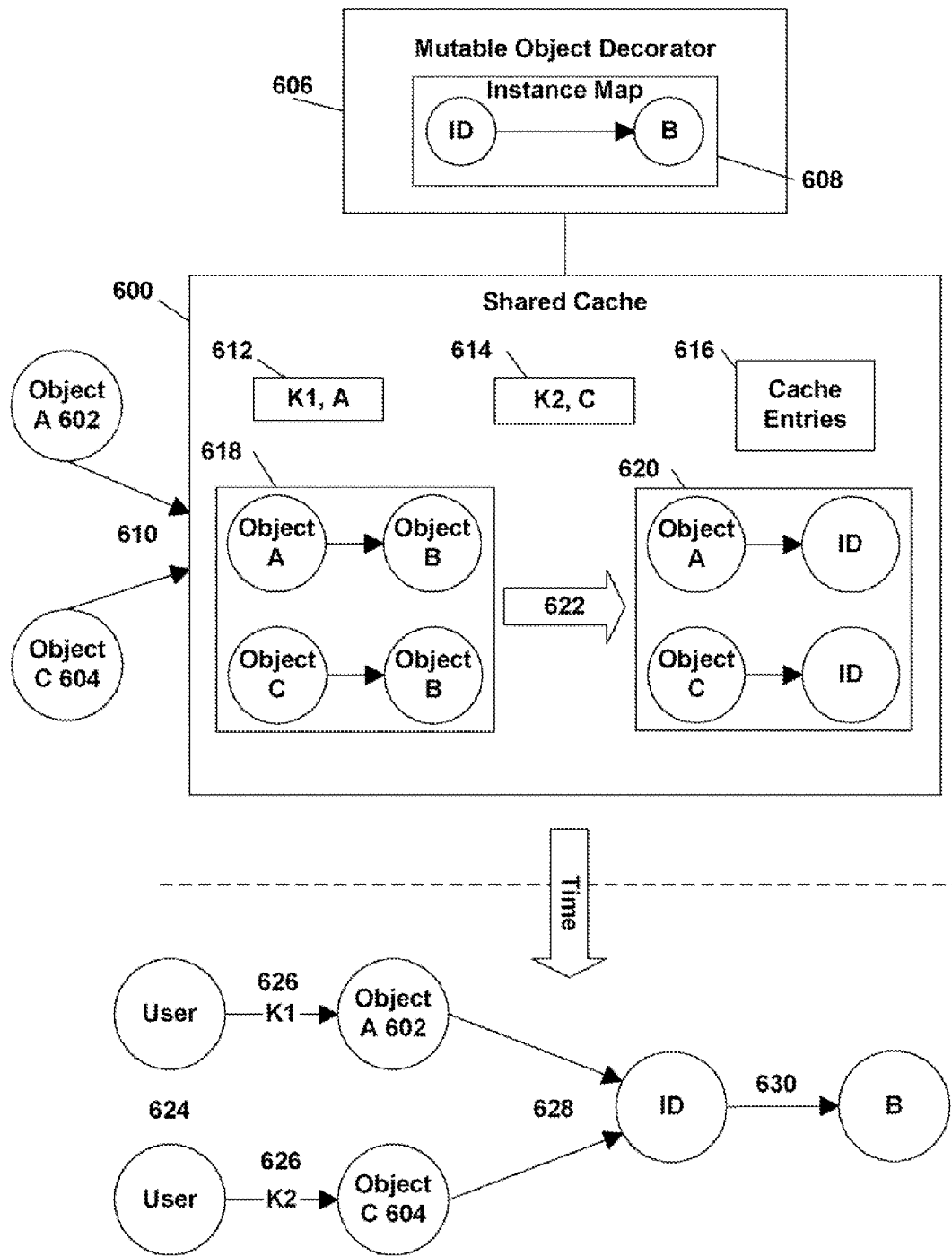
FIG. 6 shows a system for mutable object handling in accordance with an embodiment.

FIG. 6 shows a system for mutable object handling in accordance with an embodiment. Components are shown as logically distinct for the sake of clarity, it would be clear to one of ordinary skill in the art that other implementations are possible. A user adds 610 Objects A 602 and C 604 to the Shared Cache 600. The user creates two new cache entries, 612 and 614, for Objects A and C. These new entries join a plurality of cache entries 616 in the cache. Each object is indexed by a key, K1 and K2 respectively, and each object relates to Object B, as shown in box 618. A mutable object decorator 606 automatically and transparently replaces 622 each reference to Object B with a reference to Object ID, as shown in box 620. The mutable object decorator maintains an instance map 608 which maps Object B to Object ID. If a user 624 later retrieves 626 Object A or C and traverses 628 to Object ID, the user will automatically be redirected 630 to the instance of Object B stored in the instance map. This added layer ensures that the same instance is retrieved regardless of key or path.

Figure 7:
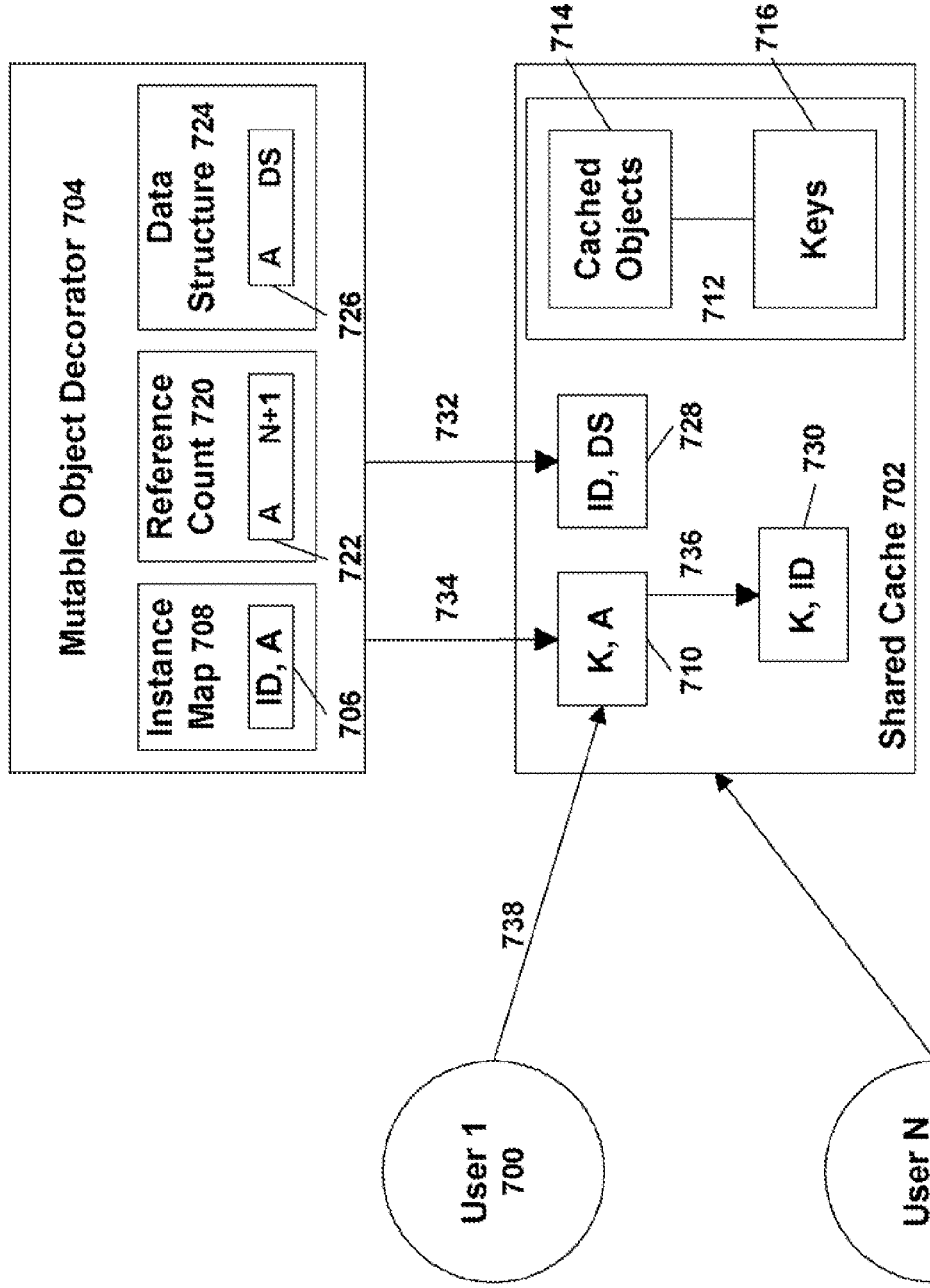
FIG. 7 shows a system for mutable object handling with multiple users in accordance with an embodiment.

FIG. 7 shows a system for mutable object handling with multiple users in accordance with an embodiment. Components are shown as logically distinct for the sake of clarity, it would be clear to one of ordinary skill in the art that other implementations are possible. The system of FIG. 7 comprises a shared cache 702. The shared cached is accessible by more than one user, as shown by User 1 700 and User N 718. The system of FIG. 7 includes a plurality of cache entries 712. The plurality of cache entries includes a plurality of cached objects 714 each indexed by a key 716. The system of FIG. 7 also includes a mutable object decorator 704 that includes an instance map 706, a reference count 720, and a data structure 724. The instance map is maintained by the mutable object decorator and maps an instance of each cached mutable object to a globally unique identification object. When User 1 adds a first cache entry 710 to the shared cache, including a first object, Object A, indexed by a first key, key K, to the shared cache, the mutable object decorator performs a series of steps. The mutable object decorator assigns Object A a first globally unique ID if Object A is a mutable object. The decorator 704 then adds an entry 706 to the instance map. The entry 706 includes the globally unique ID and mutable Object A. The decorator 704 also creates a data structure 726 that represents mutable Object A. The data structure includes information relevant to the current state of the mutable object. The decorator further adds 732 a second cache entry 728 to the shared cache. The second cache entry 728 includes the data structure indexed by the globally unique ID. The decorator also increments a reference count 722 associated with mutable Object A by one and repeats the above steps recursively to include additional objects reachable from mutable Object A. The decorator then updates 734 the first cache entry to replace the Object A with the globally unique ID to create 736 a new cache entry 730 which includes the globally unique ID referenced by key K.

Transactional Isolation and Mutable Object Handling

In one embodiment, mutable object handling is transparent to outside code. Like other caches, mutable object handling caches generally behave like extended maps, and the mutable object graphs they contain are indistinguishable from object graphs of normal Java objects. One exception to this transparency is transactional isolation. In one embodiment, the mutable object decorator can perform the functions of the transactional decorator described above. When a cached instance is mutated within a transaction, the changes are only visible to that transaction's context. Only when the transaction successfully commits do the changes become visible to other cache consumers. This is accomplished by applying the same workspace pattern used in transactional caches to mutable object state. That is, a transactional mutable object draws its state from the transaction's isolated workspace rather than its own instance fields. In one embodiment, the mutable object decorator can perform all necessary functions to enable mutable object behavior and transactional isolation.

The described usage pattern maximizes transparency to users while maintaining proper transactional semantics. Users can manipulate mutable object graphs normally and may share them across threads, though changes made in transactional threads will not be visible to other threads until commit. Use of the workspace pattern minimizes exclusive locking. Without it, transactional objects would have to be exclusively locked immediately on modification to prevent dirty reads, even within optimistic transactions.

Mutable object handling can be implemented as a decorator atop a cache. The cache remains focused on basic data storage and retrieval as well as workspace maintenance, while the mutable object decorator takes care of the mutable object and transactional requirements described above. To do so, the decorator transparently translates between user-visible object graphs and a flat cache space, and maintains an internal instance map. The instance map is a memory-sensitive mapping between unique IDs assigned to mutable objects and the instance instantiated for that object. The instance map is responsible for maintaining mutable object identity across lookups and object graphs.

Exemplary Methods

Figure 8:
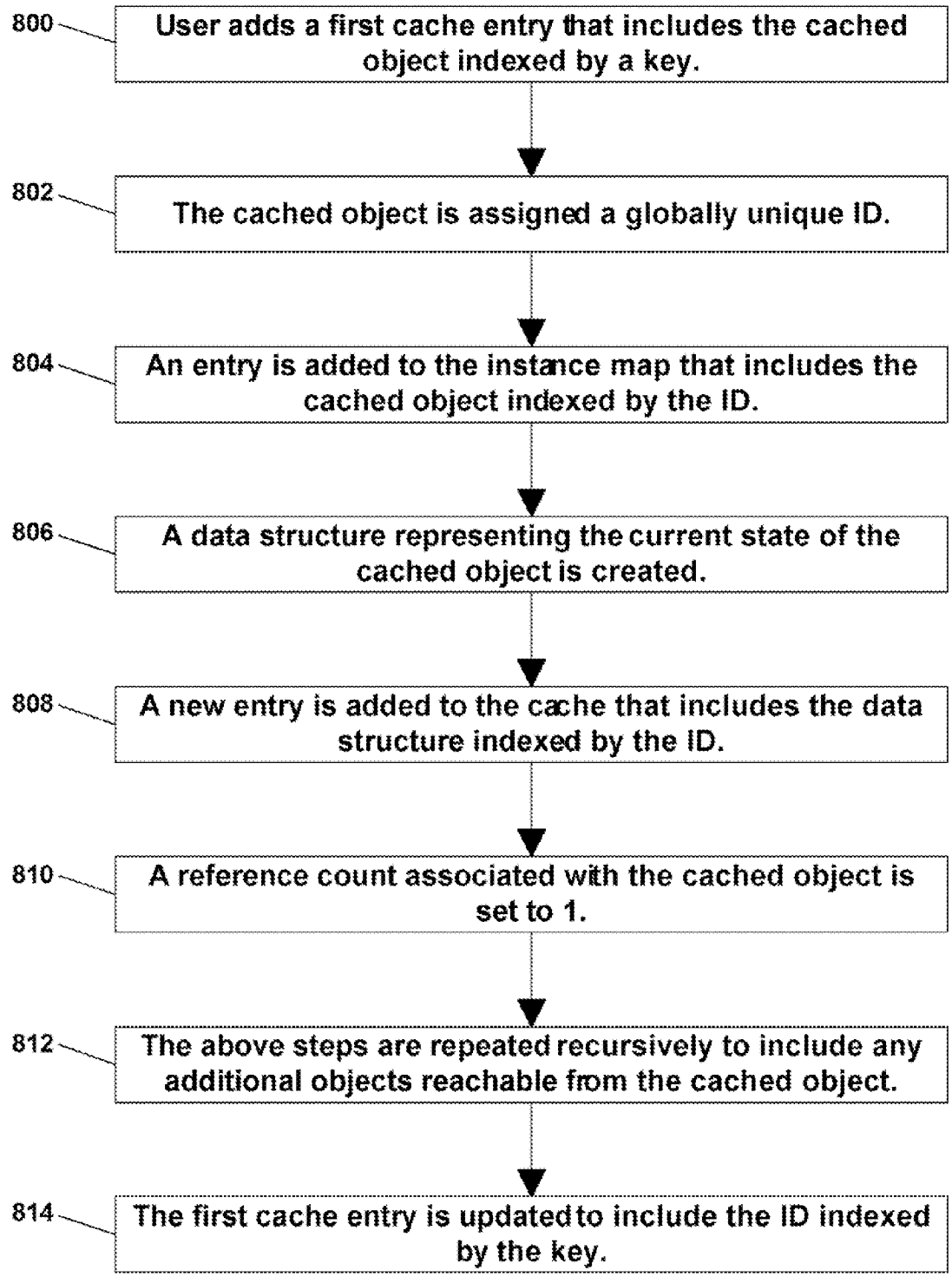
FIG. 8 shows a method for mutable object handling in accordance with an embodiment.

FIG. 8 shows a method for mutable object handling in accordance with an embodiment. At block 800, when a user adds a cache entry (K,V), where V is a mutable object and K is a key, the mutable object decorator performs the following steps on flush. At block 802, the decorator assigns V a globally unique ID. At block 804, the decorator adds an entry mapping this ID to V in the internal instance map. At block 806, the decorator creates a data structure to represent the current state of V in the cache. This data structure holds V's immutable field state, V's reference, and the unique ids of V's relations. At block 808, the decorator adds V's data structure to the cache, keyed on V's ID. At block 810, the decorator sets V's initial reference count to 1. At block 812, steps 800-808 are repeated recursively to V's relations, traversing the entire object graph reachable from V. Reference counts are incremented appropriately as the decorator discovers cross-references between objects in the object graph. At block 814, the decorator adds a cache entry mapping K to V's ID.

In one embodiment, a method for caching mutable objects comprises adding a first cache entry to a cache wherein the first cache entry includes a first object and a first key by which the first object is referenced. A first globally unique identification object (ID) is then assigned to the first object if the first object is a mutable object. Additionally, an entry to an instance map is added for the first object. The entry includes the globally unique ID and the mutable object. A data structure that represents the mutable object is then created. The data structure includes information relevant to the current state of the mutable object. A second cache entry is then added to the cache. The second cache entry includes the data structure and the globally unique ID referencing the data structure. A reference count associated with the mutable object is set to one. The above steps are repeated recursively to include additional objects reachable from the mutable object. The first cache entry is updated to replace the first object with the globally unique ID to create a new cache entry which includes the globally unique ID referenced by the first key.

Figure 9:
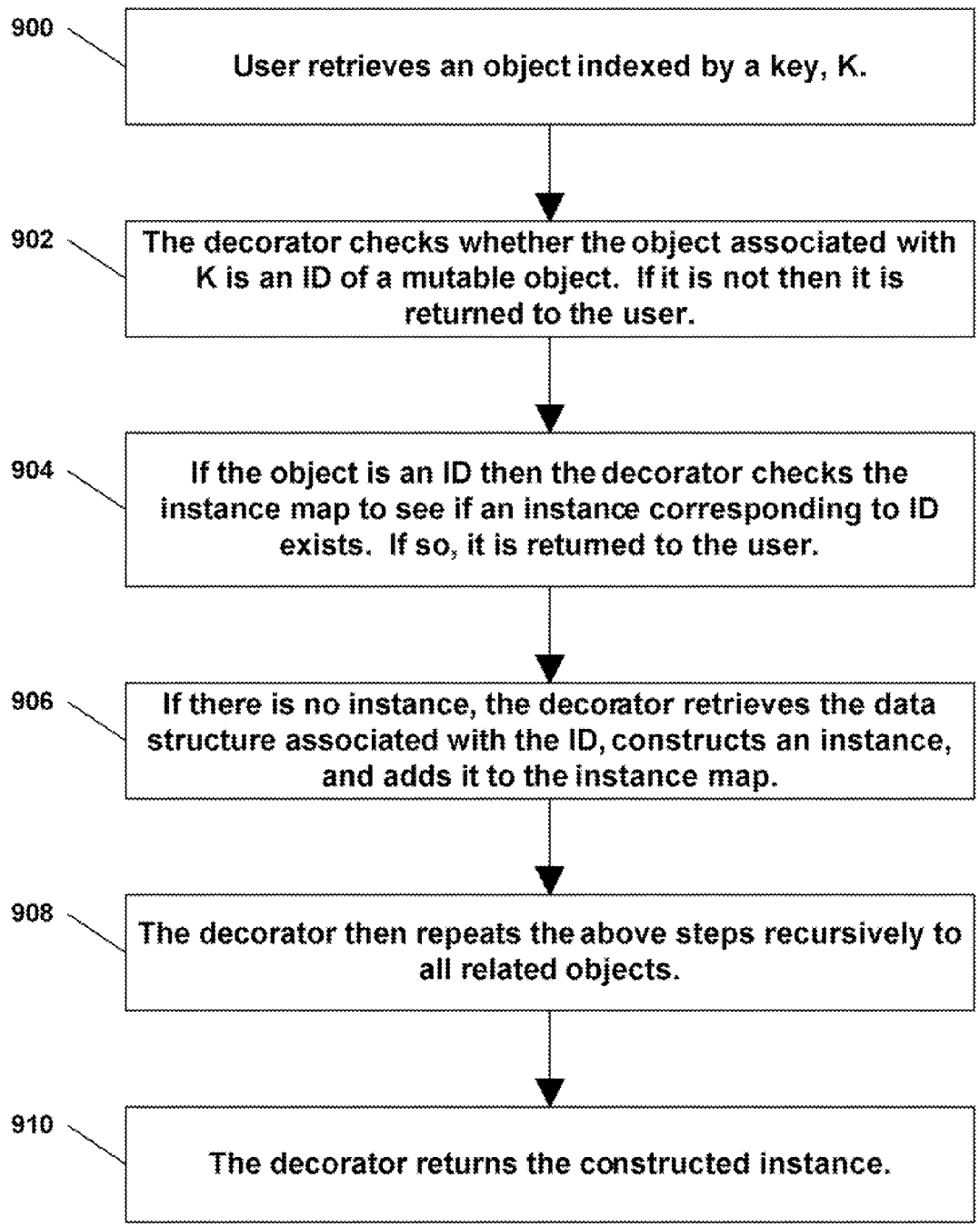
FIG. 9 shows a method for retrieving an object from a cache in accordance with an embodiment.

FIG. 9 shows a method for retrieving an object from a cache in accordance with an embodiment. At block 900, when a user retrieves a key K, the decorator does the following: At block 902 the decorator checks to see whether K's value is the ID of a mutable object. If not, the decorator returns the value directly. Otherwise at block 904, the decorator checks the instance map to see if an instance has already been constructed for the data structure matching this ID. If so, the decorator returns the instance. Otherwise at block 906, the decorator finds the data structure for the given ID in the cache. The decorator then constructs an instance of the correct user-visible class for the data structure, and populates it with the data structure's stored data. The constructor then adds an entry mapping the id to this instance in the instance map. At block 908, this process is applied recursively to the IDs of relations held in the data structure so that the entire object graph is reconstituted. This recursive process may be performed immediately, or may be done lazily as user traverses relations. At block 910, the decorator returns the constructed instance.

As described above, in one embodiment, mutable objects are stored in the cache not as instances of their original classes, but as data structures of immutable state, including immutable field values and the IDs of related mutable values.

Every such data structure—and therefore every mutable object—is identified by a unique ID so that object graphs can be reconstituted with references to the correct instances, including shared references within an object graph or across object graphs. Data structures are cached individually on their IDs within the flat cache space for easy lookup. The mutable object decorator hides these cache entries from the user. Reference counting is used to determine when a data structure is no longer referenced from any other cached objects and can be safely removed from the cache.

A Java annotation can allow users to identify their mutable object types. In another embodiment, constructing instances of user-defined classes and transferring their state to and from cached data structure is accomplished through hooks added to the class bytecode. Additional hooks are employed to detect access to instance fields. This allows the mutable object decorator to track dirty fields and to redirect state access to the transactional workspace when the instance is accessed in a transactional context. The required bytecode manipulation may be performed during the build process or dynamically on class load.

In one embodiment, the bytecode of standard mutable classes such as lists, maps, and dates cannot be modified. Rather, subclasses are generated through bytecode as needed. These subclasses exhibit the same dirty-tracking and state-intercepting behavior as modified user-defined types. Instances of standard mutable types present in object graphs are replaced with instances of these subclasses on flush. Thus, a flush represents a boundary after which held references to standard mutable objects may become invalid. Note that this applies only to newly-cached standard mutable objects—instances retrieved from a cached object graph will be instances of cacheable subclasses already. Flushes can occur explicitly if the underlying cache is a session, on before Completion within transactions, and on individual updates otherwise.

Figure 10:
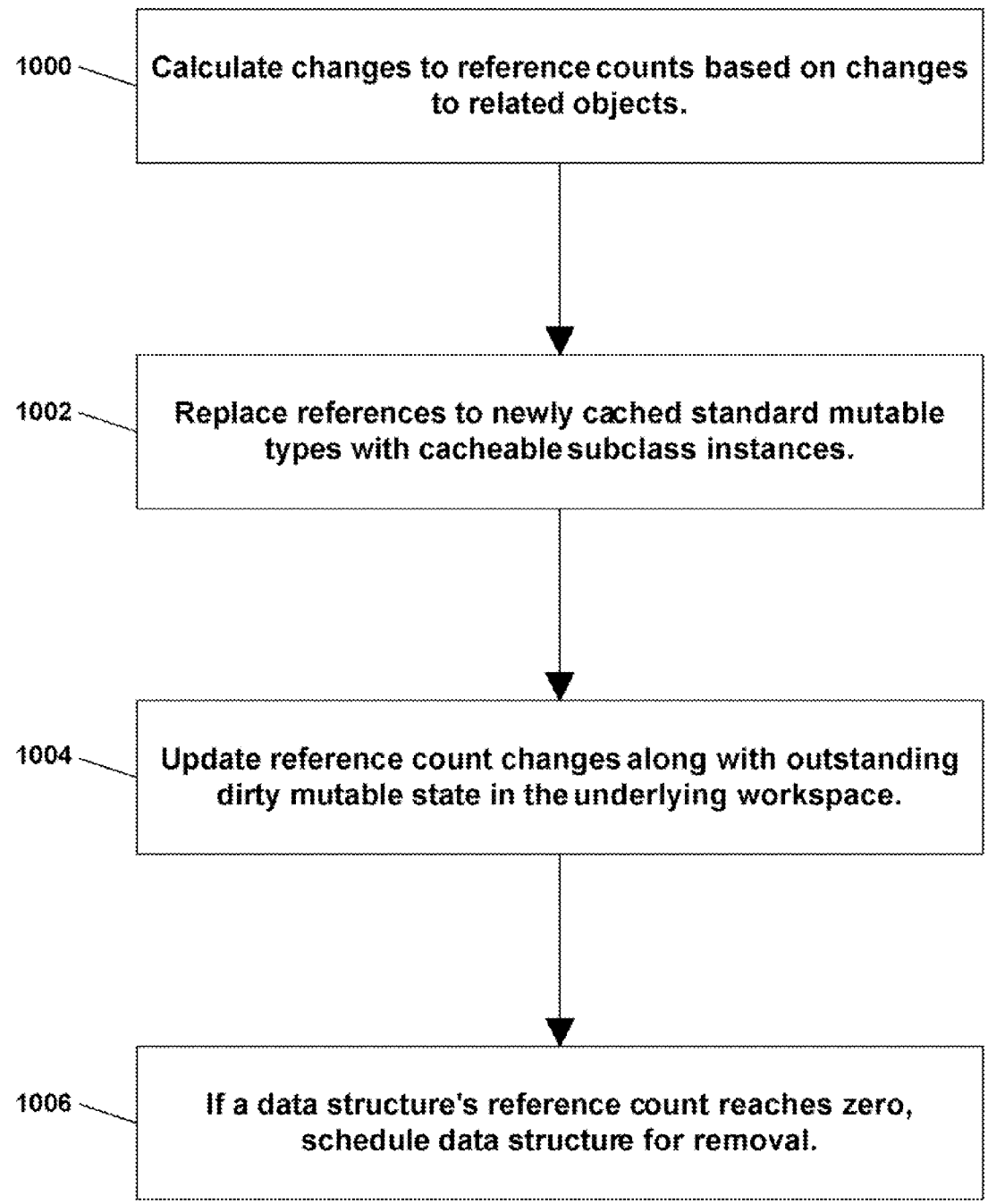
FIG. 10 shows a method for keeping cache entries current in accordance with an embodiment.

FIG. 10 shows a method for keeping cache entries current in accordance with an embodiment. At block 1000, changes to reference counts are calculated based on changes to related objects within the session, transaction, or individual update. At block 1002, references to newly-cached standard mutable types are replaced with cacheable subclass instances. At block 1004, reference count changes along with outstanding dirty mutable state are updated in the underlying workspace. At block 1006, if any data structure reference count reaches zero, the data structure's entry is scheduled for removal. When the reference count reaches zero, the cached mutable object is no longer referenced from any other cached object. The cache detects that the cached mutable object is no longer needed, removes the cached mutable object from the cache, and reclaims any space it used.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in one environment, other application servers, virtual machines, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for caching mutable objects comprising:
adding a first cache entry to a cache wherein the first cache entry includes a first object indexed by a first key;
if the first object is a mutable object, then
assigning the first object a first globally unique identification object (ID);
adding an entry to an instance map wherein the entry includes the first globally unique ID and the mutable object;
creating a data structure that represents the mutable object, wherein the data structure includes information relevant to the current state of the mutable object;
adding a second cache entry to the cache wherein the second cache entry includes the data structure and the first globally unique ID referencing the data structure;
setting a reference count associated with the mutable object to one;
updating the first cache entry to replace the first object with the first globally unique ID to create a new cache entry which includes the first globally unique ID referenced by the first key.

2. The method of claim 1 further comprising:
repeating the above steps recursively to include additional objects reachable from the mutable object.

3. The method of claim 1 further comprising:
retrieving a second object from the cache associated with a second key;
checking the second object to determine if it is a second globally unique ID;
returning the second object if it is not a second globally unique ID.

4. The method of claim 1 further comprising:
retrieving a second object from the cache associated with a second key;
checking the second object to determine if it is a second globally unique ID;
wherein the second globally unique ID is associated with a second data structure;
checking the instance map to determine if there is an object instance associated with the second data structure;
returning the object instance associated with the second data structure.

5. The method of claim 1 further comprising:
retrieving a second object from the cache associated with a second key;
checking the second object to determine if it is a second globally unique ID;
wherein the second globally unique ID is associated with a second data structure;
checking the instance map to determine if there is an object instance associated with the second data structure;
constructing a new object instance based on the second data structure if there is no object instance associated with the second data structure;
adding the new object instance to the instance map.

6. The method of claim 1 wherein:
the cache is operable to detect changes made to mutable objects stored therein; and
the cache is further operable to automatically update the mutable objects based on the detected changes.

7. The method of claim 1 wherein:
the cache includes a plurality of entries which includes a plurality of objects;
the plurality of objects are organized as a graph of objects;
the cache uses the instance map to ensure the same instance of an object is accessed regardless of starting point on the graph of objects.

8. The method of claim 1 further comprising:
wherein the cache is a transactional cache;
detecting an operation on the transactional cache by a current thread;
getting a current transaction for the current thread;
finding a workspace associated with the current thread using a thread map;
applying the operation to the workspace;
waiting for the current transaction to complete; and
wherein the operation includes changes made to an object stored in the transactional cache.

9. The method of claim 8 further comprising:
initiating a transaction completion process;
obtaining write locks for cache entries corresponding to the operation in the workspace;
applying the changes from the workspace to the cache entries;
releasing the write locks; and
clearing the workspace.

10. The method of claim 8 wherein the changes are only visible from the current thread.

11. The method of claim 8 wherein after the transaction completes, the changes are viewable from other threads.

12. A system for caching mutable objects comprising:
at least one computer including a computer readable medium and a processor operating thereon;
a shared cache wherein the shared cache is accessible by more than one user and wherein the shared cache includes a plurality of cached objects each indexed by a key;
a mutable object decorator;
an instance map, maintained by the mutable object decorator, which maps an instance of each cached object to a globally unique identification object (ID), wherein each cached object is assigned its globally unique ID by the mutable object decorator;
wherein when a first user adds a first cache entry to the shared cache, including a first object indexed by a first key and if the first object is a mutable object, the mutable object decorator
assigns the first object a first globally unique ID;
adds an entry to the instance map wherein the entry includes the first globally unique ID and the mutable object;
creates a data structure that represents the mutable object, wherein the data structure includes information relevant to the current state of the mutable object;
adds a second cache entry to the cache wherein the second cache entry includes the data structure and the first globally unique ID referencing the data structure;
sets a reference count associated with the mutable object to one;
repeats the above steps recursively to include additional objects reachable from the mutable object;
updates the first cache entry to replace the first object with the first globally unique ID to create a new cache entry which includes the first globally unique ID referenced by the first key.

13. The system of claim 12 wherein the mutable object decorator also:
retrieves a second object from the cache associated with a second key;
checks the second object to determine if it is a second globally unique ID;
returns the second object if it is not a second globally unique ID.

14. The system of claim 12 wherein the mutable object decorator also:
retrieves a second object from the cache associated with a second key;
checks the second object to determine if it is a second globally unique ID;
wherein the second globally unique ID is associated with a second data structure;
checks the instance map to determine if there is an object instance associated with the second data structure;
returns the object instance associated with the second data structure.

15. The system of claim 12 wherein the mutable object decorator also:
retrieves a second object from the cache associated with a second key;
checks the second object to determine if it is a second globally unique ID;
wherein the second globally unique ID is associated with a second data structure;
checks the instance map to determine if there is an object instance associated with the second data structure;
constructs a new object instance based on the second data structure if there is no object instance associated with the second data structure;
adds the new object instance to the instance map.

16. The system of claim 12 wherein:
the shared cache is operable to detect changes made to mutable objects stored therein; and
the shared cache is further operable to automatically update the mutable objects based on the detected changes.

17. The system of claim 12 wherein:
the plurality of objects are organized as a graph of objects;
the cache uses the instance map to ensure the same instance of an object is accessed regardless of starting point on the graph of objects.

18. The system of claim 12 further comprising:
wherein the cache is a transactional cache;
a transactional decorator operable to
- detect an operation on the transactional cache by a current thread,
- retrieve a current transaction for the current thread,
- find a workspace associated with the current thread using a thread map,
- apply the operation to the workspace,
- wait for the current transaction to complete, and
- wherein the operation includes changes made to an object stored in the transactional cache.

19. The system of claim 18 further comprising:
wherein the user initiates a transaction completion process; and
wherein the transactional decorator
- obtains write locks for cache entries corresponding to the operation in the workspace,
- applies the changes from the workspace to the cache entries,
- releases the write locks, and
- clears the workspace.

20. The system of claim 18 wherein the changes are only visible from the current thread.

\* \* \* \* \*

UNITED STATES PATENT AND TRADEMARK OFFICE
CERTIFICATE OF CORRECTION

PATENT NO. : 8,095,731 B2  
APPLICATION NO. : 12/266403  
DATED : January 10, 2012  
INVENTOR(S) : White Page 1 of 1

It is certified that error appears in the above-identified patent and that said Letters Patent is hereby corrected as shown below:

In column 3, line 21, delete "FIG. 2a," and insert -- FIG. 2, --, therefor.

Signed and Sealed this  
Third Day of April, 2012

David J. Kappos  
*Director of the United States Patent and Trademark Office*